Jan. 2, 1968   J. RABINOW   3,362,010
VEHICLE IDENTIFICATION SYSTEM
Filed March 23, 1961
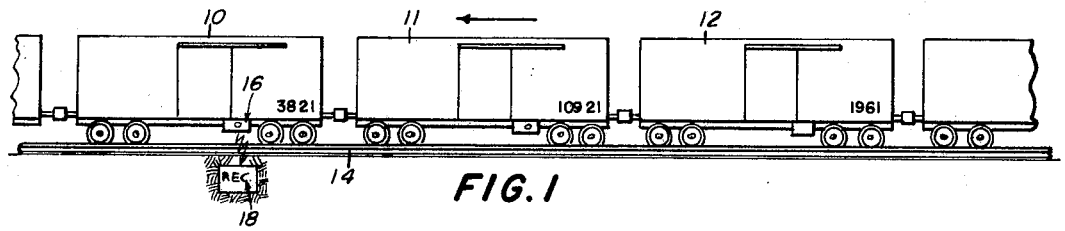
FIG.1
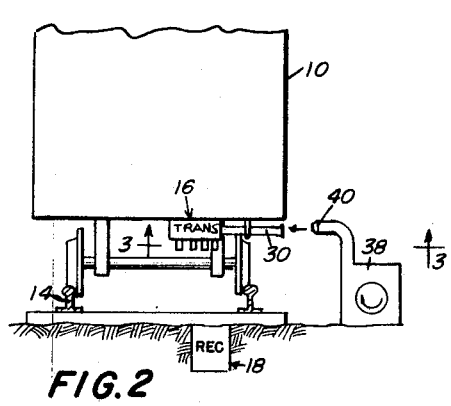
FIG.2
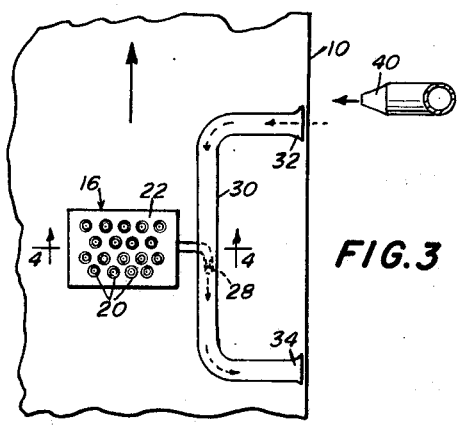
FIG.3
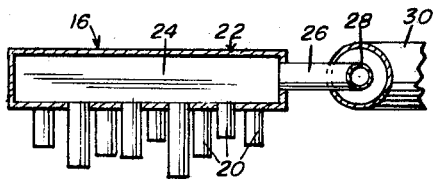
FIG.4
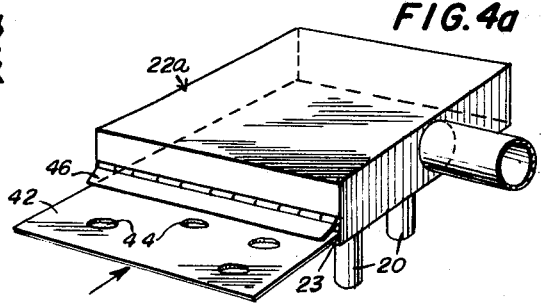
FIG.4a
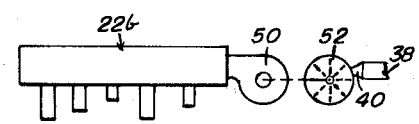
FIG.4b
FIG.4c
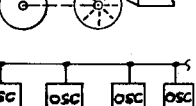
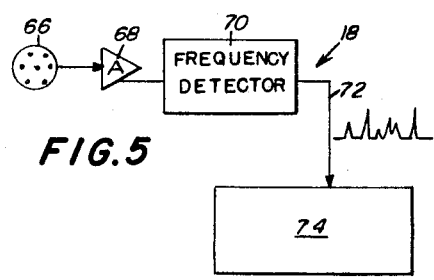
FIG.5
INVENTOR
JACOB RABINOW
BY Joseph A. Genovese &
Max L. Libman
ATTORNEYS

United States Patent Office 3,362,010
Patented Jan. 2, 1968

3,362,010
VEHICLE IDENTIFICATION SYSTEM
Jacob Rabinow, Takoma Park, Md., assignor, by mesne assignments, to Control Data Corporation, Minneapolis, Minn., a corporation of Minnesota
Filed Mar. 23, 1961, Ser. No. 97,829
8 Claims. (Cl. 340—16)

This invention relates to systems for identifying mobile objects, and principally to systems for identifying railway cars while they are in motion.

Railway routing and accounting procedures require records which identify the cars of a train. To obtain such records a checker reads the identification marks, usually numerals, on the sides of the cars as they pass a given point, and records the information on a form sheet. This has been the practice for at least 60 years. As early as 1904, the F. A. Schierberg Patent No. 784,595 described in detail the still current practice of checking freight cars and many of the resulting difficulties.

The Schierberg patent and also the G. L. Douglass Patent No. 1,387,642 indicates that my present invention is not the first attempt to simplify and greatly increase the accuracy of vehicle checking. Yet, to my knowledge the old method of inspection by a human being and hand written record-making is still used. Prior attempts to mechanize the record keeping of railway cars have relied on a register located below the cars, together with a mechanical actuator secured to the cars so that as the cars moved past the register, mechanical actuation of register mechanisms resulted. There are major drawbacks in this type of solution to the problem. One is the expense of equipment involved, and another is the requirement of a car-to-ground reference, i.e. a physical tolerance must be maintained.

An object of my invention is to provide an inexpensive system for automatically identifying railway cars, requiring no mechanical coupling between the cars and a ground reference.

Another object of my invention is to provide a vehicle identification system which employs a transmitter of signals peculiar to individual cars, together with a receiver for these signals. It is preferred, although not absolutely essential, that the transmitter operate in the inaudible, i.e. ultrasonic frequency range because of the directional nature thereof, although the signals can be in the audible frequency range.

By relying on either audible or inaudible signals, I am able to construct very inexpensive transmitters for the railway cars. This is a prime factor in the adoption of any automatic checking system. Furthermore, an ultrasonic transmitter amounting to a number of "whistles" is more reliable than prior systems which have been mechanical and/or electrical in nature.

Various embodiments of my invention include refinements of my basic system. For instance, the transmitted signals form a code which identifies a given vehicle. The code may be adjusted to suit the individual cars in several ways such as using apertured cards to inhibit some of the tone generators, or otherwise plugging one or more of the generators.

Another feature of certain forms of my invention is the aspiration of the tone generators each time that they are called upon to yield a signal. This keeps the tone generators clean and provides two signal operations for each cycle. The aspiration is automatically obtained by a very simple means having no moving parts.

Other objects and features of importance will become evident in following the description of the illustrated forms of the invention which are given by way of example only.

FIGURE 1 is a schematic elevational view of a part of a railway car train showing one suggested arrangement of the transmitters and receiver.

FIGURE 2 is an elevational view of one of the cars and showing particularly the relationship between the transmitter and receiver.

FIGURE 3 is an enlarged sectional view taken approximately on the line 3—3 of FIGURE 2.

FIGURE 4 is a sectional view taken on line 4—4 of FIGURE 3.

FIGURE 4a is a perspective view showing a modification of the transmitter.

FIGURE 4b is a diagrammatic elevational view showing another modification.

FIGURE 4c is a diagrammatic view showing an electrical version of my invention.

FIGURE 5 is a schematic view of the receiver.

FIGURE 1 shows vehicles such as railroad cars 10, 11, 12, 13, etc., on rails 14. The cars have the usual identification numerals on their sides. My invention automatically prepares a record identifying the vehicles, without attempting to read the numerals. Instead, I provide a transmitter 16 on each car, and a receiver 18 located at the place where the car identity is to be ascertained. The transmitted signal or signals are peculiar to one vehicle.

Transmitter 16, in its simplest form, is shown in FIGURES 2–4. It is composed of a tone generating device which preferably operates in the inaudible, ultrasonic range. Transmitter 16 may be attached at any convenient place on the car, one being the bottom surface of the car. The tone generating device has a number of whistles 20, and means to conduct a fluid, e.g. air, under pressure to operate them. Therefore, I have shown a casing 22 having walls defining a pressure chamber 24 with which whistles 20 communicate. Conveniently, the whistles are attached in openings in the lower wall of the casing. When transmitter 16 is attached to the vehicle, the whistles are directed toward receiver 18.

An air pressure inlet line 26 is connected with casing 22 and terminates in a venturi 28 (FIGURE 3) located in duct 30. The duct is attached to the car, and it is approximately U-shaped with air scoops 32 and 34 at its ends. Venturi 28 is parallel to the axis of a portion of duct 30 so that when air under pressure is applied in one direction into the duct, a vacuum is formed at the downstream end of venturi 28 and in line 26, cleaning the tubes in preparation for the operating cycle. When air under pressure is applied to scoop 34 at the other end of duct 30, venturi 28 is exposed to ram pressure so that whistles 20 operate and become discharge outlets for the air. Accordingly, a single cycle of operation entailing the application of pressure successively to scoops 32 and 34 will cause the tone generators to be aspirated.

It is possible to use available pressure (air, steam, etc.) of the railway train to operate the transmitter, collateral difficulties or objections are raised by tapping the air or steam lines of railway trains. As an alternative, therefore, I have shown an air pressure generator 38 (FIGURE 2) located adjacent to receiver 18. The pressure generator is simply a blower, source of compressed air, or the like, having an outlet nozzle 40 directed toward the inlet scoops 32 and 34 of duct 30 as the railway car moves past the nozzle 40. A reading station is established by the receiver 18 location, where the signals from transmitter 16 are received.

FIGURE 4a shows a modification where casing 22a has a slot 23 to receive a code card 42. The code is ordinarily established by the various tones generated by an array of whistles 20. The code may be changed by plugging any of the whistles, and, an easy way of doing this is by using card 42 which has apertures 44 registering with those whistles that are to remain open (operative)

and imperforate sections to block the others. In this form of my transmitter, slot 23 may have a spring-closed door 46 normally covering the slot, or any other provision for assuring that the card 42 will remain in place, and there will be no appreciable pressure loss through the card entrance. Obviously, to change the code it is only necessary to remove and replace the card 42 or alter the card. The card may be made of any material including plastic, cardboard, metal, etc.

FIGURE 4b is a diagrammatic view showing another modification. In this form, transmitter 22b includes a blower 50 to provide air under pressure for actuation of the whistles. The blower is mechanically driven by an air turbine 52 (in place of line 26, venturi 28 and duct 30), the turbine being operated by air under pressure from generator 38.

The modification in FIGURE 4c is an electrical analogy of other forms. I have shown pressure generator 38 to supply air under pressure to a turbine 56 which is mechanically coupled to an electric generator 58. The tone generators in this instance are oscillator circuits 60, 61, 62, etc. The oscillators can be made very inexpensively, relying on low voltage transistor oscillator circuits. Each oscillator 60, 61, 62, etc., will produce a given tone in the audible or inaudible range. These oscillators drive ultrasonic transducers, like the piezoelectric types. Also the oscillators may produce signals whose components in the electromagnetic range are used. Such a form is practical because of the short distance between the car undercarriage and the receiver. These forms of my invention are especially well suited for continual operation by using an electrical source on the train to eliminate the necessity of pressure generator 38 and turbine 56.

Receiver 18 (FIGURE 5) is composed of a generally directional microphone 66 whose output is amplified at 68 and applied to a frequency analyzing detector 70. Detector 70 is a commercially available device, for example the one of those offered by General Radio Co. and other companies. The output line 72 of the frequency detector conducts signals corresponding to the tones generated by the transmitter whereby the code for each vehicle corresponding to the vehicle identity (number) may be used to actuate any type of conventional register 74 or storage device (punched tape, punched cards, magnetic tape, a printer, etc.).

By using binary coding of N different frequencies, I can produce $2^N$ different combinations. For example, 10 different frequencies will provide 1024 combinations; 20 frequencies will give me over one million combinations. To prevent harmonics from introducing difficulties, it is generally advisable to keep all of the frequencies within one octave. Parity check systems, and other checking expedients well known in the computer art, may be used to minimize the chance of error. To increase accuracy, or the possible number of combinations, two successive transmitters for one car may be energized, spaced slightly in time. This will require only slightly more sophisticated circuitry in the receiver.

Briefly summarizing the operation, each car is equipped with a tone generator. A reading station is established by the location of receiver 18. In those forms (all forms shown) relying on a stationary source of air under pressure, the pressure generator 38 is located at the reading station. As the cars move through the reading station, the air under pressure directly or indirectly operates the tone generator which in turn, provides coded signals peculiar to its vehicle. The signal code is received and manifested in any of the known usual ways.

It is understood that the illustrated forms of my invention are given by way of example only, and that all modifications, changes and the like within the scope of the claims may be resorted to.

I claim:
1. In a signal system for a plurality of vehicles, the improvement comprising means including, a group of whistles of different frequencies for providing a code by means of the different frequencies, means for mounting said group of whistles on one of the vehicles, and a receiver for said code frequencies to transduce the code frequencies to an electrical signal.
2. The system of claim 1 and means for concurrently operating all of said whistles of said group.
3. The system of claim 1 and means to change said code-providing-means in a manner to change the code for a given vehicle, said code changing means including means to render selected whistles of said group ineffective.
4. A signal system for vehicles, said system including: a code signal transmitter, there being a transmitter for each vehicle, each transmitter having a plurality of whistles to provide a plurality of frequency components which form said code signal, means to operate said transmitter by blowing the whistles thereof to provide said plural-frequency code signal, and a frequency responsive receiver for said code signal.
5. The signal system of claim 4 and a casing forming an air chamber, said whistles attached to said casing and communicating with said chamber, and said blowing means blowing air into said chamber thereby blowing all of said whistles simultaneously.
6. The signal system of claim 5 and means to block selected whistles to thereby change the code signal by altering the group of frequency components of said signal.
7. The signal system of claim 4 wherein at least one of said whistles provides a frequency component of the code signal in the ultrasonic frequency range.
8. A signal system for a plurality of vehicles, said system comprising: means which include a group of whistles of different frequencies for providing a code owing to the different frequencies, means for mounting said group of whistles on one of the vehicles, means including a wayside source of fluid directed towards the vehicle-mounted whistles as they pass said source for operating all of the whistles of said group, and a receiver for said code frequencies to transduce the code frequencies to an electrical signal.

References Cited
UNITED STATES PATENTS

| | | | |
|---|---|---|---|
| 1,868,489 | 7/1932 | Barry | 340—47 |
| 2,138,855 | 12/1938 | Hailes | 340—23 |
| 2,138,880 | 12/1938 | Powell | 246—2 |
| 2,567,552 | 9/1951 | Cronin | 340—16 |
| 2,828,480 | 3/1958 | Golladay | 340—258 |
| 3,016,457 | 1/1962 | Brown et al. | 181—.52 |
| 1,733,718 | 10/1929 | Blondel | 340—16 |
| 2,578,347 | 12/1951 | Gagnaire | 340—34 |
| 3,004,258 | 10/1961 | Cohen et al | 340—32 |
| 2,602,853 | 7/1952 | Harrison | 340—171 |
| 2,535,162 | 12/1950 | Rodgers | 246—122 |
| 2,615,968 | 10/1952 | Bonanno | 116—137 |
| 3,045,909 | 7/1962 | Auer | 235—92 |

FOREIGN PATENTS 807,343   1/1959   Great Britain.

MAYNARD R. WILBUR, *Primary Examiner.*

MALCOLM A. MORRISON, ROBERT C. BAILEY, *Examiners.*

P. J. HIRSCHKOP, G. D. SHAW, *Assistant Examiners.*